United States Patent [19]

Ogawa et al.

[11] 4,409,291
[45] Oct. 11, 1983

[54] MAGNETIC RECORDING MEDIUM

[75] Inventors: Hiroshi Ogawa; Akira Kasuga; Yasuo Tamai; Yasuyuki Yamada, all of Odawara, Japan

[73] Assignee: Fuji Photo Film Co., Ltd., Kanagawa, Japan

[21] Appl. No.: 247,573

[22] Filed: Mar. 26, 1981

[30] Foreign Application Priority Data

Mar. 26, 1980 [JP] Japan ................... 55-38405

[51] Int. Cl.$^3$ ....................... H01F 10/02; B32B 27/40
[52] U.S. Cl. ................................. 428/425.9; 427/128; 360/134; 360/135; 360/136; 252/62.54; 428/694; 428/695; 428/900; 428/423.7
[58] Field of Search ................... 428/425.9, 694, 695, 428/900, 423.7; 252/62.54; 427/128; 360/134–136

[56] References Cited

U.S. PATENT DOCUMENTS

| 3,922,439 | 11/1975 | Hartmann et al. | 428/425.9 |
| 4,284,750 | 8/1981 | Amirsakis | 428/425.9 |
| 4,286,022 | 8/1981 | Vermillion et al. | 427/128 |
| 4,310,565 | 1/1982 | Lehner et al. | 427/128 |
| 4,320,171 | 3/1982 | Motz et al. | 428/423.7 |

Primary Examiner—Ellis P. Robinson
Attorney, Agent, or Firm—Sughrue, Mion, Zinn, Macpeak and Seas

[57] ABSTRACT

A magnetic recording medium is described comprising a non-magnetic support having formed thereon a magnetic layer comprising a binder and fine ferromagnetic particles dispersed therein, said binder containing a polyester polyurethane prepared by reacting poly(1,6-hexane adipate) with 4,4'-diphenylmethane diisocyanate.

10 Claims, No Drawings

MAGNETIC RECORDING MEDIUM

BACKGROUND OF THE INVENTION

This invention relates to a magnetic recording medium, and more particularly to a magnetic recording medium having a high degree of surface smoothness and orientation of magnetic particles (high squareness ratio), good running properties, and great durability.

A magnetic recording medium, such as audio cassette tape used to record music, required to have flat frequency characteristics and high fidelity in reproduction of the original sound. In addition, the increased use of auto stereophonic sound systems and radio/cassette tape recorders has made it more necessary that magnetic recording media have good running (referring to transport through a recording/reproduction apparatus) properties and great durability.

Very high-density recording is often performed on video cassette tape by shortening the recording wavelength or reducing the track width, and this requires magnetic tape that provides high output and faithful reproduction of the original picture (i.e., a high S/N ratio). A total tape thickness of less than 20 μm being not uncommon, the widespread use of portable video tape recording (VTR) devices has made it mandatory to develop VTR tape which is capable of running unaffected for a period much longer than the conventional tape can achieve.

Thus, there is much demand for both audio and video tapes having a higher degree of surface smoothness and orientation of magnetic particles, better running properties and greater durability.

To meet this demand, various binder compositions have been proposed, but none of those proposed has been found to satisfy all of the requirements specified above. To provide good running properties and durability, many binder compositions include a thermoplastic polyurethane which is primarily a polyester polyurethane prepared by reacting poly(1,4-butylene adipate) with tolylene diisocyanate. But it is often difficult to provide a magnetic recording medium having satisfactory surface smoothness, orientation of magnetic particles, running properties, and durability from a binder composition containing a polyester polyurethane derived from poly(1,4-butylene adipate). A binder composition containing a polyester polyurethane prepared by reacting polyethylene adipate and 4,4'-diphenylmethane diisocyanate is described in U.S. Pat. No. 4,135,016, but does not satisfy all of the above requirements either.

SUMMARY OF THE INVENTION

Therefore, one object of this invention is to provide a novel magnetic recording medium.

Another object of this invention is to provide a magnetic recording medium having a high degree of surface smoothness and gloss.

A further object of this invention is to provide a magnetic recording medium having a high squareness ratio (i.e. high degree of orientation of fine ferromagnetic particles).

Still another object of this invention is to provide a magnetic recording medium having good running properties and durability.

As a result of review of many types of binder compositions, it has now been found that good magnetic tape having a high degree of surface smoothness and orientation of magnetic particles, good running property and great durability yet achieving faithful reproduction of the original sound and picture can be provided by using a binder whose polyurethane component is a polyester polyurethane prepared by reacting poly(1,6-hexane adipate) with 4,4'-diphenylmethane diisocyanate.

Therefore, the objects of this invention can be achieved by forming on a support a magnetic layer comprising a binder containing a polyester polyurethane prepared by reacting poly(1,6-hexane adipate) with 4,4'-diphenylmethane diisocyanate and fine ferromagnetic particles dispersed therein.

DETAILED DESCRIPTION OF THE INVENTION

The polyurethane formed as a product of reaction between poly(1,6-hexane adipate) and 4,4'-diphenylmethane diisocyanate is a polyester polyurethane having a molecular weight of from 50,000 to 200,000 which is produced by reacting 4,4'-diphenylmethane diisocyanate with a polyester polyol (m.w.=500 to 5000) terminated with a hydroxyl group and derived from 1,6-hexanediol and adipic acid. The reaction between polyester polyol and diisocyanate may be performed in the presence of a chain extender made of a small amount of diol such as 1,4-butanediol or 1,6-hexanediol or a diamine such as p,p'-methylenedianiline or 4,4'-methylenebis(2-chloroaniline). The polyester polyurethanes defined above are commercially available under the trademark "FR-11" from Nippon Polyurethane Industry Co., Ltd.

A polyisocyanate compound may be used in the binder of this invention, and such a polyisocyanate compound includes: a reaction product of 3 mols of diisocyanate such as tolylene diisocyanate, xylylene diisocyanate, or hexamethylene diisocyanate with 1 mol of trimethylolpropane; a burette adduct comprising 3 mols of hexamethylene diisocyanate; and isocyanurate adduct comprising 5 mols of tolylene diisocyanate; an isocyanurate adduct comprising 3 mols of tolylene diisocyanate and 2 mols of hexamethylene diisocyanate; and a polymer compound such as diphenylmethane diisocyanate. Such compounds are commercially available from Nippon Polyurethane Industry Co., Ltd., under the trademarks "Colonate L", "Colonate HL", "Colonate 2030", "Milionate MR", etc.; from Sumitomo Bayer Urethane Co., Ltd. under the trademarks "Desmodule L", "Desmodule N", "Desmodule IL", "Desmodule HL", etc.; and from Takeda Chemical Industries, Ltd., under the trademarks "Takenate D-102", "Takenate D-110N", "Takenate D-202", etc.

The polyurethane as a product of the reaction between poly(1,6-hexane adipate) with diphenylmethane diisocyanate is used in this invention either alone or in combination with the polyisocyanate compound or other resins such as a cellulose derivative, e.g. nitrocellulose, cellulose acetate or cellulose acetate butyrate; a vinyl chloride acetate resin, e.g. vinyl chloride/vinyl acetate copolymer, vinyl chloride/vinyl acetate/vinyl alcohol copolymer, or vinyl chloride/vinyl acetate/maleic anhydride copolymer; a vinylidene chloride resin, e.g. vinylidene chloride/vinyl chloride copolymer or vinylidene chloride/acrylonitrile copolymer; a polyester resin, e.g. alkyd resin or linear polyester; an acrylic resin, e.g. acrylic acid/acrylonitrile copolymer or methyl acrylate/acrylonitrile copolymer; a polyvinyl acetal, polyvinyl butyral, phenoxy resin, epoxy resin or butadiene/acrylonitrile copolymer. These resins may be used independently or as a mixture.

For the purposes of this invention, the binder contains at least 5 wt%, and preferably at least 10 wt%, based on the total weight of the binder, of the polyester polyurethane prepared by reacting poly(1,6-hexane adipate) with 4,4'-diphenylmethane diisocyanate. If the binder contains less than 5 wt% of the polyurethane, a magnetic layer having less running-durability is obtained.

If the polyurethane is used in combination with a polyisocyanate compound to cure the magnetic layer, the binder contains at least 15 wt%, and preferably at least 20 wt%, again based on the total weight of the binder, of the polyurethane, and at least 5 wt%, and preferably at least 10 wt% of the polyisocyanate compound. If the binder contains less than 15 wt% of the polyester polyurethane, a less durable resulting magnetic layer is obtained, and if the binder contains less than 5 wt% of the polyisocyanate compound, its curing effect is not exhibited fully and its heat-resistance is not improved.

The binder described above is used in an amount of from 10 to 50 parts by weight, and preferably from 15 to 35 parts by weight, per 100 parts by weight of ferromagnetic particles.

The magnetic recording medium of this invention is prepared by forming a magnetic coating solution (paint) which has dispersed in an organic solvent the binder, fine ferromagnetic particles, and conventional additives, applying the paint to a support, and drying the film obtained.

Preferred examples of the ferromagnetic fine powder are fine powders of $\gamma\text{-Fe}_2\text{O}_3$, Co-modified iron oxide, and alloys having iron as the primary component. The particle size of the ferromagnetic powder is generally from about 0.02 to about 1$\mu$ and preferably from about 0.02 to about 0.5$\mu$. Examples of such fine ferromagnetic powder, as well as additives and organic solvents, and methods of dispersion and application are described, for example, in Japanese Patent Applications (OPI) Nos. 108804/77, 21805/79, 46011/79, etc. (the term "OPI" as used herein refers to an unexamined published Japanese patent application) and U.S. Pat. No. 4,135,016.

The invention is now described in greater detail by reference to the following examples, which are provided for illustrative purposes only, and are not intended to limit the scope of the invention. In the examples, all parts are by weight.

EXAMPLE 1

The following composition was mixed in a ball mill for 24 hours to form a uniform dispersion which was filtered through a filter having an average mesh size of 3$\mu$ to prepare a coating solution:

| | |
|---|---|
| $\gamma\text{-Fe}_2\text{O}_3$ (Hc = 400 oersteds, acicular ratio = 10/1, av. grain length = 0.4$\mu$) | 300 parts |
| Vinyl chloride (VC)/vinyl acetate (VAc)/vinyl alcohol (VOH) copolymer (molar ratio = 92:3:5, degree of polymerization = 420) | See Table 1 below |
| Polyester polyurethane prepared by reacting poly(1,6-hexane adipate) with 4,4'-diphenylmethane diisocyanate (m.w. = ca. 130,000) | See Table 1 below |
| Oleic acid | 3 parts |
| Dimethyl polysiloxane (degree of polymerization = ca. 60) | 0.6 parts |
| Methyl ethyl ketone | 500 parts |

-continued

| | |
|---|---|
| Cyclohexanone | 200 parts |

The resulting magnetic coating solution (paint) was applied with a reverse roll coater onto a polyethylene terephthalate film (7$\mu$ thick), and while the paint was still wet, the film was subjected to orientation of magnetic field with an electromagnet (1000 gauss) and dried to provide a layer having a dry thickness of 5$\mu$. The dried film was super-calendered to provide a smooth magnetic layer. The film was then slit into audio cassette tape 3.81 mm wide (compact cassette type). Four tape samples were prepared in the manner described above, and their characteristics are shown in Table 1 below.

COMPARATIVE EXAMPLE 1

Four control tape samples were prepared by repeating the procedure of Example 1 except that the polyester polyurethane prepared by reacting poly(1,6-hexane adipate) with 4,4'-diphenylmethane diisocyanate was replaced by a polyester polyurethane (m.w.=ca. 100,000) prepared by reacting poly(1,4-butane adipate) with tolylene diisocyanate.

The characteristics of the control tape samples are set forth in Table 1 below.

The various tape characteristics indicated in following Tables 1 and 2 were measured or evaluated by the following methods:

(a) Surface gloss

The percent total reflection was measured with a standard gloss meter (digital gloss meter Model GK 45D of Suga Testing Machine Co., Ltd.) at an angle of incidence of 45 degrees and an angle of reflection of 45 degrees.

(b) Squareness ratio

The ratio of the residual flux density (Br) to the maximum flux density (Bm) was measured in an external magnetic field of 1 kilo-oersted for the samples in Table 1, 2 kilo-oersteds for Sample Nos. 5 to 8 and Control Sample Nos. C-5 to C-8, and 5 kilo-oersteds for Sample No. 9 and Control Sample No. C-9, using a vibratory flux magnetic meter Model VSM-3 of Toei Kogyo Co., Ltd.

(c) Audio running properties

Tape running tests were conducted with 20 commercial cassette tape decks to see how orderly the tape samples could be wound, and the results were evaluated on a three-grade basis.

A . . . could be wound orderly.
B . . . could not be wound orderly on 1 to 5 decks.
C . . . could not be wound orderly on 5 to 10 decks.

(d) Tape squeal

The presence of any tape squeal was also checked during the tape running tests, and the results were evaluated on a three-grade basis.

A . . . No tape squeal was heard.
B . . . Occasional squeals were heard during 1 or 2 passes.
C . . . Squeals were heard during 3 or more passes.

(e) Head staining

After evaluation of the tape running property, the head if each deck was checked for the presence of stain and the results were evaluated on a three-grade basis.

A . . . Stain was absent or hardly detectable.
B . . . Some but negligible stain
C . . . Considerable stain (f) Audio output The output at 315 Hz was measured with cassette tape deck Model 582 of Nakamichi Co., Ltd. using QP-12 of BASF A.G. as a reference tape that was assumed to produce an output of 0 dB.

(g) Frequency characteristics

The output at 10 KHz minus the output at 315 Hz was measured.

(h) Video running property

Video tape running tests were conducted with 20 commercial VHS video tape decks to see if any jitter or skew occurred, and the results were evaluated on a three-grade basis.

A . . . No jitter or skew
B . . . Some but insignificant jittering or skewing
C . . . Frequent jittering or skewing caused a problem.

(i) Still life

The time (min) for a serious defect to occur in a picture reproduced in a still mode was measured using a Model NV-6600 of Matsushita Electric Industrial Co., Ltd.

(j) Video output

The output at 4 MHz was measured using Model NV-6600 of Matsushita Electric Industrial Co., Ltd. using VHS tape of Fuji Photo Film Co., Ltd. as a reference tape that was assumed to deliver an output of 0 dB.

(k) S/N ratio

The S/N ratio at 10 KHz to 4 MHz after visibility correction was measured with Model NV-6600 of Matsushita Electric Industrial Co., Ltd.

| | |
|---|---|
| Vinyl chloride (VC)/vinyl acetate (VAc)/ maleic anhydride (MA) copolymer (molar ratio = 86:13:1, degree of polymerization = 430) | See Table 1 |
| Polyester polyurethane prepared by reacting poly(1,6-hexane adipate) with 4,4'-diphenylmethane diisocyanate (m.w. = ca. 130,000) | See Table 1 |
| Oleic acid | 3 parts |
| Dimethyl polysiloxane | 0.6 parts |
| Alumina (av. grain length = 0.5μ) | 6 parts |
| Methyl ethyl ketone | 500 parts |
| Cyclohexanone | 200 parts |

To the dispersion, a polyisocyanate compound ("Colonate L-75" of Nippon Polyurethane Industry Co., Ltd.) was added in the amounts indicated in Table 2 (based on the solids content), followed by stirring for another one hour. The resulting dispersion was filtered through a filter having an average mesh size of 1μ to obtain a coating solution.

The resulting coating solution was applied with a reverse roll coater onto a polyethylene terephthalate film (14μ thick), and while the coating obtained was still wet, the film was subjected to orientation of magnetic field with a magnet (3000 G), and then dried to provide a layer having a dry thickness of 5μ. The film was super-calendered to provide a smooth magnetic layer. The film was then slit into video cassette tape ½ inch wide (VHS type video cassette). Four video tape sam-

TABLE 1

| | Sample No. | Parts of VC.VAc.VOH copolymer | Parts of Polyester Poly- urethane | Surface gloss | Squareness ratio (Br/Bm) | Audio running properties | Tape squeal | Head staining | Audio output (dB) | Frequency characteristics (dB) |
|---|---|---|---|---|---|---|---|---|---|---|
| Example 1 | 1 | 54 | 6 | 150 | 0.86 | A | A | B | 1.5 | 3.7 |
| | 2 | 48 | 12 | 160 | 0.86 | A | A | A | 1.6 | 3.9 |
| | 3 | 42 | 18 | 170 | 0.87 | A | A | A | 1.7 | 4.3 |
| | 4 | 36 | 24 | 180 | 0.87 | A | A | A | 1.7 | 4.6 |
| Comparative Example 1 | C-1 | 54 | 6 | 140 | 0.84 | A | A | C | 1.1 | 2.4 |
| | C-2 | 48 | 12 | 145 | 0.84 | A | A | B | 1.2 | 2.7 |
| | C-3 | 42 | 18 | 150 | 0.85 | B | B | B | 1.3 | 2.9 |
| | C-4 | 36 | 24 | 160 | 0.85 | C | C | C | 1.3 | 3.1 |

From the data in Table 1, it can be seen that audio tape Sample Nos. 1 to 4 of this invention, that used in the binder the polyester polyurethane prepared by reacting poly(1,6-hexane adipate) with 4,4'-diphenylmethane diisocyanate, had higher surface gloss, higher squareness ratio, and better orientation of γ-Fe₂O₃ particles than control audio tape Sample Nos. C-1 to C-4 that used the conventional polyester polyurethane in the binder. Tape Sample Nos. 1 to 4 also had better audio running properties, caused less tape squeal and head stain, and provided better durability. Table 1 also shows that Tape Sample Nos. 1 to 4 provided higher audio output and frequency characteristics, and hence achieve more faithful reproduction of the original sound.

EXAMPLE 2

The following composition was mixed in a ball mill for 24 hours to form a uniform dispersion.

| | |
|---|---|
| Co-coated Berthollide iron oxide (coated with 2.0 atomic % Co, FeO = 1.4, Hc = 660 oersteds, acicular ratio = 10/1, av. grain length = 0.5μ) | 300 parts | ples were prepared in the manner described above, and their characteristics are shown in Table 2 below.

COMPARATIVE EXAMPLE 2

Four control video tape samples were prepared by repeating the procedure of Example 2 except that the polyester polyurethane prepared by reacting poly(1,6-hexane adipate) with 4,4'-diphenylmethane diisocyanate was replaced by a polyester polyurethane (m.w.=ca. 100,000) prepared by reacting poly(1,4-butane adipate) with tolylene diisocyanate. The characteristics of the tape samples are set forth in Table 2.

EXAMPLE 3

A video tape sample was prepared by repeating the procedure of Example 2 except that the Co-coated Berthollide iron oxide was replaced by a fine Fe-Ni alloy powder (Fe:Ni=90:10, Hc=1300 oersteds, acicular ratio=10/1, av. grain length=0.4 μm). The characteristics of the sample are shown in Table 2.

COMPARATIVE EXAMPLE 3

A control video cassette tape sample was prepared by repeating the procedure of Comparative Example 2 except that the Co-coated Berthollide iron oxide was replaced by fine Fe-Ni alloy powder (the same as what was used in Example 3). The characteristics of the sample are shown in Table 2.

TABLE 2

|  | Sample No. | Parts of VC.VAc.MA copolymer | Parts of Polyester Polyurethane | Polyisocyanate compound | Surface gloss | Squareness ratio (Br/Bm) | Video running properties | Still life (min) | Video output (dB) | S/N ratio (dB) |
|---|---|---|---|---|---|---|---|---|---|---|
| Example 2 | 5 | 64 | 12 | 4 | 170 | 0.81 | A | >120 | 0.0 | 50 |
|  | 6 | 52 | 20 | 8 | 180 | 0.82 | A | >120 | 1.0 | 51 |
|  | 7 | 40 | 24 | 16 | 180 | 0.82 | A | >120 | 1.5 | 52 |
|  | 8 | 32 | 24 | 24 | 190 | 0.82 | A | >120 | 2.0 | 53 |
| Comparative | C-5 | 64 | 12 | 4 | 130 | 0.80 | A | 80 | −2.0 | 47 |
| Example 2 | C-6 | 52 | 20 | 8 | 140 | 0.79 | B | 70 | −1.5 | 48 |
|  | C-7 | 40 | 24 | 16 | 150 | 0.80 | B | 60 | −1.5 | 48 |
|  | C-8 | 32 | 24 | 24 | 160 | 0.80 | C | 60 | −0.5 | 49 |
| Example 3 | 9 | 25 | 15 | 10 | 260 | 0.80 | A | 60 | 10.0 | 51 |
| Comparative Example 3 | C-9 | 25 | 15 | 10 | 210 | 0.78 | C | 10 | 6.0 | 46 |

From the data in Table 2, one can see that video tape Sample Nos. 5 to 9 of this invention (that used in the binder the polyester polyurethane prepared by reacting poly(1,6-hexane adipate) with 4,4'-diphenylmethane diisocyanate) had higher surface gloss, higher squareness ratio, and achieved better dispersion of the Co-coated Berthollide iron oxide particles and the fine Fe-Ni alloy powder than control video tape Sample Nos. C-5 to C-9 that used the conventional polyester polyurethane in the binder. Tape Samples Nos. 5 to 9 had better video running properties, provided a longer still life, and better durability. Table 2 also shows that Tape Sample Nos. 5 to 9 provided a higher video output and S/N ratio, and hence achieved more faithful reproduction of the original picture.

From the results described above, it can be seen that the binder composition of this invention, that contains a polyester polyurethane prepared by reacting poly(1,6-hexane adipate) with 4,4'-diphenylmehane diisocyanate, provides a better dispersion of fine ferromagnetic particles than the binder composition containing the conventional polyester polyurethane, and that it also provides a magnetic recording medium having a smoother surface, a higher squareness ratio, better running properties and greater durability than the magnetic recording medium produced by using a binder containing the conventional polyester polyurethane.

While the invention has been described in detail and with reference to specific embodiments thereof, it will be apparent to one skilled in the art that various changes and modifications can be made therein without departing from the spirit and scope thereof.

What is claimed is:

1. A magnetic recording medium, comprising:
a non-magnetic support; and
a magnetic layer formed on a surface of said non-magnetic support, said layer comprising fine ferromagnetic particles dispersed in a binder, said binder comprised of:
a polyester polyurethane in an amount of at least 5 wt%, said polyester polyurethane prepared by reacting poly(1,6-hexane adipate) with 4,4-diphenylmethane diisocyanate; and
a vinyl chloride acetate resin selected from the group consisting of vinyl chloride/vinyl acetate copolymer, vinyl chloride/vinyl acetate/vinyl alcohol copolymer and vinyl chloride/vinyl acetate/maleic anhydride copolymer.

2. A magnetic recording medium as in claim 1 wherein said polyester polyurethane has a molecular weight of from 50,000 to 200,000.

3. A magnetic recording medium as in claim 1 wherein said polyester polyurethane is prepared by reacting a poly(1,6-hexane adipate) terminated with a hydroxyl group with 4,4'-diphenylmethane diisocyanate.

4. A magnetic recording medium as in claim 1, 2, or 3, wherein the polyester polyurethane is prepared by conducting the reaction in the presence of a chain extender.

5. A magnetic recording medium as in claim 1, 2, or 3, wherein the binder contains said polyester polyurethane in an amount of at least 10 wt%.

6. A magnetic recording medium as in claim 1, 2, or 3, wherein polyisocyanate compound is used to cure the magnetic layer, and the binder contains said polyester polyurethane in an amount of at least 15 wt% and said polyisocyanate compound in an amount of at least 5 wt%.

7. A magnetic recording medium as in claim 1, 2, or 3, wherein polyisocyanate compound is used to cure the magnetic layer, and the binder contains said polyester polyurethane in an amount of at least 20 wt% and said polyisocyanate compound is used in an amount of at least 10 wt%.

8. A magnetic recording medium as in claim 1, 2, or 3, wherein the binder is used in an amount of from 10 to 50 parts by weight per 100 parts by weight of the ferromagnetic particles.

9. A magnetic recording medium as claimed in claim 1, wherein said resin is vinyl chloride/vinyl acetate/vinyl alcohol copolymer.

10. A magnetic recording medium as claimed in claim 9, wherein polyisocyanate compound is used to cure said magnetic layer, said binder containing said polyester urethane in an amount of at least 15 weight % and said polyisocyanate compound is an amount of at least 5 weight %.

* * * * *